May 16, 1961

C. J. AFFELDER 2,984,796

AMPLITUDE MODULATION MONITOR

Filed March 25, 1957

Charles J. Affelder
INVENTOR

BY H. L. Godfrey
ATTORNEY

May 16, 1961

C. J. AFFELDER 2,984,796

AMPLITUDE MODULATION MONITOR

Filed March 25, 1957

*Charles J. Affelder*
INVENTOR

BY *H. T. Godfrey*
ATTORNEY

United States Patent Office 2,984,796
Patented May 16, 1961

2,984,796

AMPLITUDE MODULATION MONITOR

Charles J. Affelder, 7704 Marbury Road, Bethesda, Md.

Filed Mar. 25, 1957, Ser. No. 648,446

7 Claims. (Cl. 332—39)

(Granted under Title 35, U.S. Code (1952), sec. 266)

The invention described herein may be manufactured and used by or for the Government of the United States for governmental purposes without the payment to me of any royalty thereon in accordance with the provisions of 35 U.S.C. 266.

The invention relates to an amplitude modulation monitor, primarily designed for monitoring the percentage modulation of amplitude modulated (AM) transmitters. The invention is particularly useful when the transmtter is modulated by a series of non-recurrent waves as in speech and music transmission.

In many instances, there has been a great demand for monitoring apparatus which will read percentage modulation of positive or negative peaks, and provide an overmodulation alarm, and yet require a minimum of eifort and skill for re-calibration. Generally, calibration of monitors requires very accurate standards or quite elaborate procedures supervised by highly skilled personnel. Another problem is that a sensitive meter is generally sluggish and fails to give accurate readings, where the modulated output is a series of non-recurrent waves of relatively short duration.

The main object of this invention is to provide a monitor circuit which elminates the above disadvantages. Another object is to provide an amplitude-modulation monitor which incorporates means for direct calibration, without the use of standards. Still another object is to provide a unique mon tor which will provide an indication of a failure of carrier, or over-modulation.

The novel monitoring system comprises means for demodulating a sample of the transmitter output. The A.-C. and D.-C. components are applied directly to the grid of a cathode follower. The D.-C. component is balanced against a D.-C. reference voltage, and the remaining A.-C. is rectified and applied to a timing circuit. The output of the timing circuit is applied to a D.-C. amplifier which drives the percentage modulation meter.

For the overmodulation alarm circuit a portion of the A.-C. component is applied directly to the control grid of a thyratron, which in the absence of an input signal is biased so that it just triggers. A given percentage of an equal portion of the D.-C. component is chosen for application to the control grid by setting of a potentiometer, preferably having taps selectable in 5% modulation increments between 50% and 100%. When the A.-C. component equals or exceeds the D.-C. component the thyratron triggers and operates a relay which may control an overmodulation lamp.

Other and further objects and advantages of the invention will become more apparent from the following description, reference being had to the accompanying drawings in which.

Figure 1:
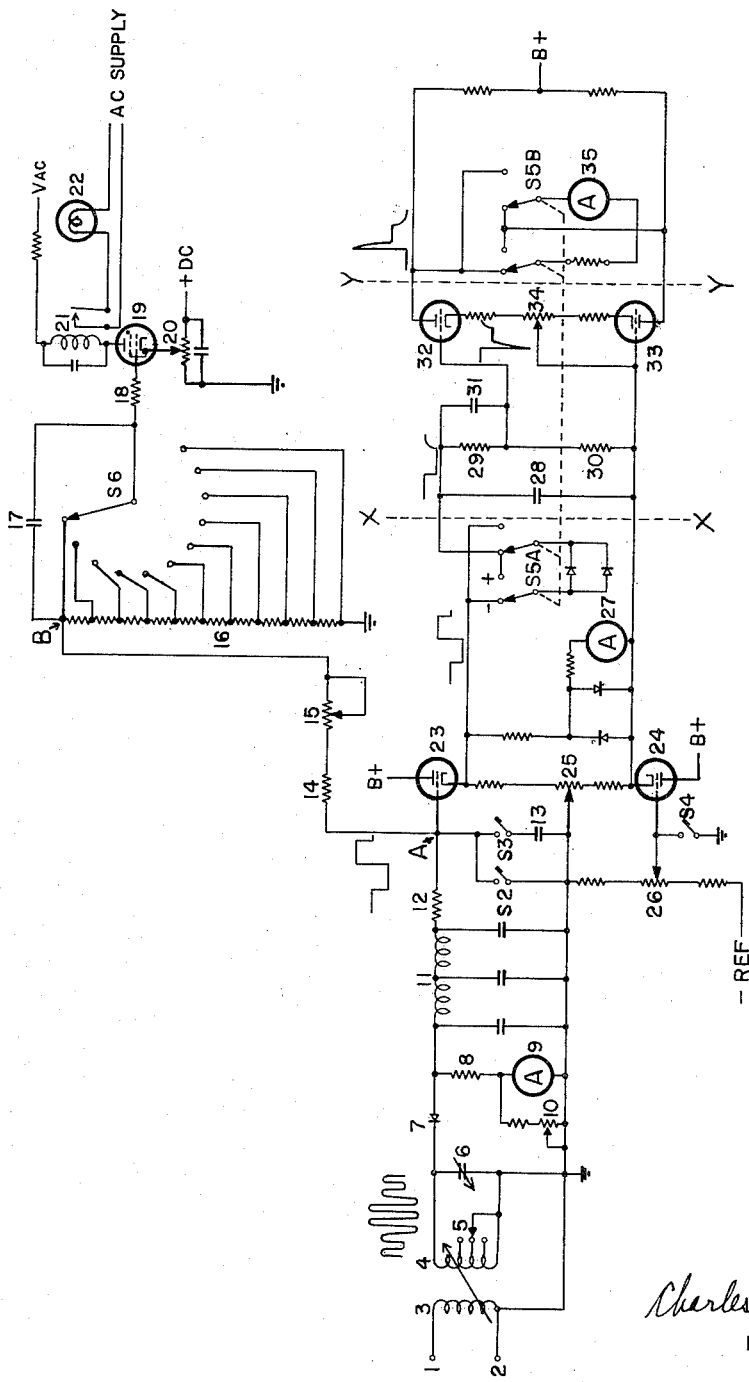
Figure 1 is a modulation monitor schematic of a preferred form of the invention.

Referring now to Figure 1, input terminals 1, 2 are provided for applying some of the output of a transmitter which is to be monitored, to a low impedance coil 3. This coil is coupled to a tuned circuit 4–6, which has a variable tap 5 on the inductance 4 for frequency-band switching. This tuned circuit is loaded by the following diode detector circuit, so that there is no significant sideband attenuation over the operating range of the instrument. A diode load resistor 8 is connected in series with a carrier meter 9.

Diode 7 is followed by a radio-frequency (RF) filter 11 which removes the RF components, leaving only a negative D.-C. component which is proportional to the average carrier level and an A.-C. component which is proportional to the original modulated carrier at point A.

Point A is connected to the end of a tapped potentiometer 16, through resistor 14 and potentiometer 15. The taps are preferably adjusted in 5% increments between 50% and 100% modulation. Switch S–6 connects the selected tap to the control grid of a thyratron 19. The condenser 17 is connected between the top or ungrounded end of potentiometer 16 and the thyratron control grid. The thyratron plate is connected through relay 21 to a suitable alternating current source, and a variable d rect current voltage is applied to the grid-cathode circuit by potentiometer 20. A lamp 22 is connected in series with a set of contacts of the relay 21 and a suitable power source as shown.

Point A is also connected to the grid of a triode 23. Switch S–2 is connected between the triode grid and ground, and switch S–3 in series with condenser 13 is also connected from the triode grid to ground. The cathode of triode 23 is connected to ground through a portion of potentiometer 25. Triode 24, which may be included in the same envelope with triode 23, has its cathode returned to ground through potentiometer 25, as shown in Figure 1. A d rect current reference voltage is applied to the grid of triode 24.

The output of triodes 23 and 24, which are connected as cathode followers, is balanced by means of potentiometer 25, in a manner to be described hereinafter. A parallel pair of silicon diodes, reversible by means of the switch S–5A, rectifies the output of the balanced triodes and applies it to the timing circuit, which produces a sharp spike at the leading edge of the applied pulse.

The timing circuit comprises a condenser 28 to which the output of tubes 23, 24 is applied. The resistors 29, 30 are connected across condenser 28, and a condenser 31 is connected across resistor 29. The grid of triode 32 is connected to the junction between resistors 29, 30, while the grid of triode 33 is connected to the other side of resistor 30. The value of condenser 28 is large compared to condenser 31, and resistor 29 is large compared to resstor 30. It is readily apparent that condenser 31 and associated resistors 29, 30 comprise a well known differentiating circuit. It is understood that other differentiating circuits, such as the conventional series resistance-shunt inductance crcuit may also be used.

Triodes 32 and 33 are D.C. amplifiers for driving the percentage modulation meter 35. Potentiometer 34 provides for zero adjustment of meter 35 in a manner to be explained. Switch S–5B, which is ganged with switch S–5A, provides for reading either positive or negative pulses.

Figure 2:
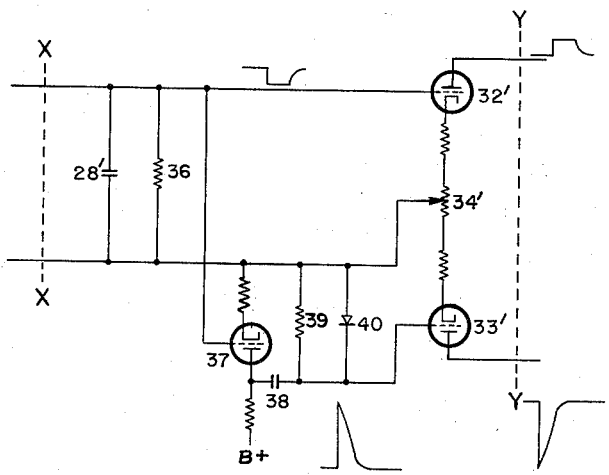
Figure 2 is another embodiment of the timing circuit and driver of Figure 1.

Figure 2 shows an alternate type of timing circuit which may be substituted for that portion of Figure 1 between the dotted lines X—X and Y—Y.

More particularly, in this modification the output of cathode followers 23, 24 is applied across condenser 28′ and parallel resistor 36. One side of the resistor condenser combination is connected to the grids of triodes 32′, 37, while the other side of the resistor-condenser is connected to the variable tap on potentiometer 34′. Triode 37 is a high-gain triode and is connected to a differentiating circuit comprising resistor 39 and condenser 38. Diode 40 is connected across the resistor 39 to clamp the differential amplifier (33′) grid to prevent it from accidentally being driven by incidental pulses of wrong polarity. The differentiated pulse is thus applied to differential amplifier 33', while the undifferentiated pulse is applied to differential amplifier 32'. The output of amplifiers 32', 33' is applied to the percentage modulation meter circuit as explained in connection with Figure 1.

In operation, considering more particularly Figure 1, the monitor is tuned as follows: The bandswitch 5 is set for the frequency band in use, and the coupling between coils 3 and 4 is set for minimum. An unmodulated carrier is applied and the tuned circuit is peaked for maximum reading on carrier meter 9 by varying capacitor 6. Next the coupling between coils 3 and 4 is adjusted to obtain a reading of 100 on carrier meter 9. Power is applied to the instrument, and time is allowed for sufficient warm-up. Switches S-2 and S-4 are simultaneously closed so as to ground the grids of triodes 23, 24, potentiometer 25 is set for a zero indication on the balance meter 27, and potentiometer 34 is set for zero reading on the percent modulation meter 35. The percent modulation circuit is now statically balanced for no signal condition.

With the peaks switch S-5A set to the right in Fig. 1, and with only the switch S-4 closed so as to ground the grid of triode 24, the coil coupling 3-4 is adjusted to obtain a reading of 100% on the percent modulation meter 35. The carrier potentiometer 10 is adjusted to obtain a reading of 100 on carrier meter 9. During operation, the coupling of coils 3, 4 should be varied whenever required to keep the carrier meter 9 at 100. Then, with the peaks switch S-5 set to the left, and with only switch S-2 closed so as to ground the grid of triode 23, the reference potentiometer 26 is adjusted for a reading of 100% on the percent modulation meter 35.

With the completion of the foregoing steps, the modulation meter circuit is now calibrated. As is readily apparent, by the use of the direct coupled circuits and with the use of simple switches, which preferably are the button type, rapid and accurate calibration is possible without the use of accurate external standards and test equipment.

During program monitoring, the equipment may be recalibrated very quickly by simply pressing the switch S-3, which removes the modulation frequencies, and then proceeding as outlined above.

The wave forms superimposed on Figs. 1 and 2 are typical of the voltages at the various points of the circuit, and assist in the following explanation. For example, after detection, the output of the cathode followers is rectified and the unidirectional wave rapidly charges condenser 28. The charging voltage is applied to the divider resistor 29, 30, and the meter is connected across resistor 30. At the start of the input pulse, condenser 31, connected across resistor 29, is in a discharged condition and therefore presents a very low impedance shunted across resistor 29. Therefore, until condenser 31 becomes charged, the full charging voltage of condenser 28 appears across resistor 30 and the meter 35 through the D.C. amplifier 32, 33. This, in effect, applies a spike of relatively high voltage to the meter 35 followed by a voltage proportional to the nominal input signal value which remains until the input signal disappears. Then this output voltage gradually decays as condenser 28 gradually discharges through resistors 29 and 30. The composite voltage as applied to the meter 35 is shown in the output of triode 32.

Turning now to the overmodulation alarm circuit of Fig. 1, this circuit is calibrated as follows: With only the switch S-2 closed, the peaks switch S-5 set to the left and the percent modulation peaks switch S-6 set at tap of 100%, potentiometer 20 is adjusted to a point which just causes the thyratron 19 to fire, lighting the lamp 22.

An audio frequency tone is now applied to the transmitter audio input (not shown). The audio level of the transmitter is adjusted so that a reading of exactly 50% negative is obtained on the percent modulation meter 35. Then the switch S-6 is set to the lower 50% tap. Now the flash 50% potentiometer 15 is adjusted to a point which just causes the overmodulation lamp 22 to light. Once this setting of potentiometer 15 is made, this step can be omitted for the life of the instrument. Resistors 14 and 15 may be combined into a single precision resistor of suitable value, in which case the flash 50% adjustment may be eliminated.

From the above description it is apparent that by setting the switch S-6 to the maximum value of percentage modulation at which it is desired to operate, the operator can observe when this percentage is exceeded by the flashing of lamp 22.

In the operation of the overmodulation alarm circuit, the negative D.C. component at point A is applied to the thyratron grid and maintains the tube bias below its critical conduction point. When the A.C. component equals or exceeds the portion of the D.C. component selected by switch S-6, the thyratron conducts and the lamp 22 flashes.

In summary, in routine program operation, any deviation of the balance meter 27 from zero is a warning to recalibrate, assuming the carrier meter 9 reads 100. Operation of the pushbutton switches makes quick recalibration possible even during periods of program transmission. Switch S-2 functions to remove carrier voltage from the meter and flashing lamp circuits. The switch S-3 removes modulation components only, from these circuits. With the instrument in calibration, as above described, the percent modulation meter will accurately read the peak percentage modulation, and readings for either positive or negative peaks can be obtained by means of the peaks switch S-5. In case of carrier failure, the overmodulation lamp 22 will light continuously, regardless of the setting of the switch S-6.

It is to be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In an amplitude-modulation monitor, a percentage modulation indicator circuit comprising, rectifier means for receiving amplitude modulated signals and providing a negative voltage, a pair of cathode followers so connected and arranged as to provide a differential output, a direct current reference voltage, means for directly coupling said negative voltage and said reference voltage to said cathode followers, separate switch means connected between the control grids of each cathode follower and ground, means including said switch means for balancing said output, a rectifier and timing circuit connected to said output for producing a sharp spike of voltage in response to modulated signals of non-recurrent waves of short duration, means for indicating the percent modulation, means connecting said sharp spike of voltage to said indicating means so as to increase the speed of response of said indicating means.

2. In an amplitude modulation monitoring system as defined in claim 1, wherein said timing circuit comprises a first condenser to which said pulses are applied, first and second series resistors connected across said first condenser, a second condenser connected across said first resistor, means for connecting said indicator across said second resistor, whereby a high voltage spike is delivered to said indicator to increase the high speed response of said indicator.

3. In an amplitude modulation monitor, wherein two unidirectional voltage components, one proportional to the average carrier current level and the other proportional to the modulation are derived from an amplitude modulated signal; a potentiometer connected to receive the unidirectional voltage components; a gaseous discharge device having a cathode, an anode and a control electrode, a variable unidirectional voltage supply connected between the said cathode and a ground, an alternating voltage supply connected between the said anode and a ground through an alarm indicator, a selected portion of the said potentiometer connected between said control electrode and ground to bias the said control electrode by the average carrier current level component, and a condenser connected between said control electrode and the non-grounded end of said potentiometer to vary the potential on said control electrode by the superposed modulation component so that in the absence of an amplitude modulated signal to said monitor, the cathode anode circuit will fire and in turn operate the alarm indicator on the positive half cycles of anode potential, whereas upon application of an amplitude modulated signal to the said monitor, the potential applied to the control electrode will prevent firing of the discharge device over a predetermined range of modulation but will induce firing of the discharge device and in turn operate the alarm indication on the positive half cycles of the anode potential when the said predetermined range of modulation is exceeded.

4. In a system for indicating modulation of carrier current in excess of a predetermined amount, the combination of means for producing from a modulated carrier current a correspondingly varied unidirectional voltage having a component proportional to the average carrier level and a varying component proportional to the modulation, a gaseous discharge device having at least a cathode, anode and control member, a source of variable unidirectional voltage applied between said cathode and anode, a source of alternating voltage applied between said anode and cathode via an alarm indicator, the said control member being supplied with the unidirectional voltage component output of the first mentioned means, wherein the cathode-anode circuit of the said discharge device is adjusted to conduct and in turn energize the alarm indicator in the absence of a voltage component proportional to the average carrier level to the control member and the cathode-control member circuit of the said discharge device is adjusted to prevent conduction in the said cathode-anode circuit only when the voltage component proportional to the average carrier level is in excess of the varying voltage component proportional to the modulation.

5. In an amplitude modulation monitor, a percentage modulation measuring circuit comprising: a differential amplifier consisting of first and second electron discharge tubes each having at least an anode, cathode and control grid, a source of positive potential to which the anodes of said tubes are connected, a bias resistor to which the cathodes of the said tubes are connected, means for applying the unidirectional voltage components derived from an amplitude modulated signal input to the control grid of said first tube, means for applying a reference voltage to the control grid of said second tube to be compared with the said unidirectional voltage components; separate switch means interconnected to selectively shunt across the control grids of the first and second tubes of the said differential amplifier whereby the reference voltage may be adjusted to provide a null condition with only the non-varying unidirectional voltage component of said derived voltage components; rectifier means and a differentiation circuit in series relationship connected across the cathodes of the first and second tubes of the said differential amplifier for producing a sharp voltage spike in response to non-recurrent waves of short duration; a balanced measuring circuit consisting of a pair of vacuum tube amplifiers connected across the output of the said differentiating circuit and a measuring device connected to the outputs of the said vacuum tube amplifiers; wherein the unbalance produced in the said balancing measuring circuit by a sharp voltage spike output of the said differentiating circuit increases the speed of response of the said measuring device.

6. In an amplitude modulation monitor as recited in claim 5, wherein a first condenser is connected across the output of the said rectifier, first and second series resistors connected across said first condenser, and a second condenser connected across said first resistor, said second condenser and said second resistor comprising a differentiating circuit having an R-C time constant substantially less than the duration of non-recurrent waves derived from the amplitude modulated input signal so as to provide a high voltage spike at the leading edge of said waves and a slow decay at the trailing edge.

7. In an amplitude modulation monitor as recited in claim 5, wherein a condenser and resistor in parallel relationship are connected across the output of said rectifier, a high gain electron discharge device having at least a cathode, anode and control grid, said cathode and control grid connected across said condenser and resistor, the said cathode and anode connected by a differentiating circuit consisting of a condenser and resistor, a unidirectional device connected across the said resistor to fix the polarity of the differentiated output pulse of the said differentiating circuit, and the control grid of one of the vacuum tube amplifiers of the said balanced measuring circuit connected to receive the differentiated pulse of the differentiating circuit so as to provide rapid response in the said balanced measuring circuit to modulation transients.

References Cited in the file of this patent

UNITED STATES PATENTS

| | | |
|---|---|---|
| 1,999,869 | Dome | Apr. 30, 1935 |
| 2,069,934 | Arguimbau | Feb. 9, 1937 |
| 2,125,992 | Collings | Aug. 9, 1938 |
| 2,216,232 | Dow | Oct. 1, 1940 |
| 2,496,259 | Bachmann | Feb. 7, 1950 |
| 2,548,635 | Summerhayes | Apr. 10, 1951 |
| 2,598,370 | Gruen | May 27, 1952 |
| 2,754,363 | Nelson | July 10, 1956 |

FOREIGN PATENTS

| | | |
|---|---|---|
| 629,545 | Great Britain | Sept. 22, 1949 |
| 724,028 | Germany | Aug. 17, 1942 |

OTHER REFERENCES

Pub. I. "A New Modulation Meter," The Wireless Engineer, May 1938, pages 257–261.